Patented June 19, 1951

2,557,665

UNITED STATES PATENT OFFICE 2,557,665

THIOPHENE PREPARATION FROM ALKANE AND SULFUR DIOXIDE

Kenneth L. Kreuz, Evanston, Ill., assignor to The Texas Company, New York, N. Y., a corporation of Delaware No Drawing. Application June 28, 1946, Serial No. 680,067

9 Claims. (Cl. 260—332.8)

This invention relates to the production of heterocyclic sulfur compounds and particularly to a method of producing organic compounds containing a thiophene nucleus such as thiophene and the acyclic homologs thereof.

The utility and application of thiophene compounds, e. g., organic compounds containing a thiophene nucleus, have in the past been restricted in scope and were considered solely from the standpoint of academic interest, due to the fact that economic and commercial methods of preparation were not available. Although various reactions have been proposed for the preparation of thiophene and its compounds, such reactions have been useful only for small scale laboratory preparations.

It has now been found that thiophene compounds can be synthesized from a large class of reactants in accordance with a new and improved vapor phase catalytic process which is easily adapted to commercial operations.

The process of the invention involves the reaction of a sulfur oxide and an alkane containing at least two carbon atoms in the presence of a solid contact catalyst at elevated temperatures with recovery of an organic compound containing a thiophene nucleus from the reaction product. In general, the reaction process is conducted at temperatures of at least 800° F., a space velocity (weights of alkane per hour per weight of catalyst) of at least 0.2 and a mol ratio of sulfur oxide to alkane of at least 0.5 to obtain optimum yields of thiophene compounds. It is to be understood that the particular thiophene compounds produced by the process are dependent to a large extent upon the choice of charge stock used in the reaction.

In accordance with the invention the process is especially applicable to the production of thiophene itself or to thiophene compounds possessing acyclic substituents. Low molecular weight alkanes or paraffins, such as are produced from the processing of petroleum or natural gas, constitute suitable charge stocks for the production of thiophene and the lower acyclic homologs. Such mixtures need not be separated to obtain individual hydrocarbon components, but it is usually desirable to employ a narrow fraction containing predominant amounts of alkanes having the same number of carbon atoms. When alkanes containing more than four carbon atoms are used in the reaction, acyclic homologs of thiophene, in which the remaining carbon atoms are present in one or more side chains, are the predominant product.

The best yields of thiophene are obtained when a narrow butane cut is employed and the best yields of methylthiophenes are obtained when the charge stock is a narrow pentane cut. As examples of other hydrocarbons that may be employed as charge stocks there may be mentioned ethane, propane, hexanes, heptanes, etc. There appears to be no upper limit of the number of carbon atoms the alkanes may contain, although they should be in vapor form under the reaction conditions. When relatively simple reaction products are desired, however, it is preferable to employ a charge stock containing predominant amounts of alkanes possessing from 4 to 10 carbon atoms.

Although in general sulfur oxides, such as sulfur dioxide or sulfur trioxide, may be used, the reaction is preferably conducted with sulfur dioxide. The oxides are usually employed in a free state, but they may also be employed in the combined form, such as in the form of their hydrates. The hydrates, for example, decompose at the temperature of reaction to yield a charge mixture comprising sulfur oxide and steam which serves as a diluent in the reaction mixture.

The heterocyclization reaction of the invention is conducted in the presence of a solid contact catalyst which may be described chemically as a solid contact material of the class of oxides and sulfides which are stable under the conditions of reaction. Such catalysts include metal oxides which, under the conditions of reaction, may undergo conversion to the corresponding sulfide as, for example, molybdena. It is recognized that certain of the materials classified as catalysts for the subject reaction are relatively inert catalytically as applied to conventional hydrocarbon conversion reactions. Selection of the particular catalysts to be used would depend to a large extent upon the choice of charge stock used in the reaction. The solid contact catalysts usually preferred for general application with the majority of economical charge stocks are the solid acid reacting catalysts, such as silica and the dehydrogenation catalysts. Specific examples of the types of catalysts contemplated by the invention are silica, alumina, chromia, vanadia, molybdena, titania, magnesia, boria, molybdenum sulfide, nickel sulfide, tungsten sulfide, cobalt sulfide, tin sulfide, etc., as well as mixtures and chemical combinations thereof, such as silica-alumina, chromia-alumina, molybdena-alumina, acid-treated bentonitic clays, etc.

In carrying out the process of the invention, the reactants in vapor form are introduced into a reaction chamber containing the solid contact catalyst maintained at the desired reaction temperature. The catalytic reaction zone may be either a fixed bed type or a fluid type in which the catalyst is in a subdivided form and maintained in a turbulent suspended state by the correct choice of catalyst particle size and space velocity of the reactants. Since the reaction is exothermic, it is preferable to conduct the process in accordance with a fluid catalyst technique which allows a greater control of the reaction temperature and improved contact efficiency of the reactants and catalyst.

It will be recognized that the conditions of reaction required to obtain optimum yields of the particular thiophene compound desired will vary in accordance with the particular reactants and catalyst employed as well as the type of process technique. As a general proposition, however, temperatures in the range of 800 to 1500° F., a space velocity of 0.2 to 6 weights of alkane per hour per weight of catalyst, and a mol ratio of sulfur oxide to alkane within the range of 0.5 to 4, are preferred in the majority of reactions.

The particular conditions of reaction are best illustrated by reference to the conditions involved in the reactions of normal butane over a 100-200 mesh chromia-alumina catalyst employing a fluidized fixed bed type of process technique. When charging butane over a chromia-alumina catalyst the space velocity should lie within the range of 0.5 to 1.5, with the mol ratio of sulfur dioxide to butane in the range of 1.5 to 2.5 and at a temperature of around 1100 to 1200° F. It is to be understood that the specific conditions described as optimum are those which result in optimum yields of thiophene in a single pass operation. Where a continuous or recycled process is used, it may be desirable to modify these conditions of reaction in order to obtain an optimum ultimate yield of the desired product.

The catalyst activity for optimum thiophene production will depend to some extent upon the charge stock and reaction conditions employed, but will generally be more than one hour. In any case, periodic determination of thiophene yields will indicate the practical period of catalyst activity before regeneration. When the catalyst yields are found to fall off sharply the catalyst may then be regenerated for thiophene production by conventional methods typical of the type of catalyst technique employed.

The thiophene compounds produced by the reaction may be recovered from the reaction products in accordance with conventional methods of extraction. For example, the reaction products which may comprise unreacted charge stocks, cracked products of the charge stock, olefinic compounds, unreacted sulfur oxide and steam, may be passed through a caustic soda solution to dissolve the acid gases. If the caustic soda solution is maintained cold the thiophene will condense in the form of a separate layer. The thiophene layer can then be drawn off and distilled. If the caustic soda solution is maintained hot the thiophene compounds will steam distill from the caustic solution and can then be separated from the water layer and purified by distillation. The thiophene compounds may also be recovered in crude form by a simple condensation procedure which involves passing the products into a cooled body of hydrocarbon oil, such as kerosene, in which the thiophene compounds will condense and then recovering the thiophene compounds by distillation.

It is evident that the process may be operated in accordance with any of the usual techniques for high temperature catalytic conversion. Thus, fixed catalyst beds may be used alternately in reaction and regeneration cycles; fluid catalyst operation may be used, with continuous regeneration and recycle of a powdered catalyst; fluidized fixed bed operation may be used in which the catalyst particles remain in the reaction zone during alternate reaction and regeneration cycles.

The process of the invention may be further illustrated by the following specific examples:

Example I

Normal butane and sulfur dioxide in a mol ratio of approximately 1.5 mols of sulfur dioxide per mol of butane were mixed, preheated to approximately 1100° F., and charged to a fluidized fixed bed reactor containing about 290 grams of a 40-100 mesh silica gel catalyst. The temperature of the reaction zone was maintained at about 1100° F. and at substantially atmospheric pressure, with a space velocity of approximately 0.5 weight of butane per hour per weight of catalyst. A two-hour run was made during which time the thiophene recovered represented a 37.3% by weight conversion of the butane charge.

Example II

Normal pentane and sulfur dioxide in a mol ratio of approximately 0.9 mol of sulfur dioxide per mol of pentane were mixed, preheated and charged to a fixed bed reactor containing a commercial pelleted chromia-alumina catalyst containing approximately 10% chromia. The temperature in the reaction zone was maintained at an average of 1015° F., with the pentane space velocity at approximately 0.75 weight of pentane per hour per weight of catalyst. The run was continued for a period of two hours and the products obtained represented a 6.3% conversion to 2-methyl thiophene and a 5.3% conversion to thiophene, based on the weight of the pentane charge.

Example III

Isopentane and sulfur dioxide in a mol ratio of approximately 1.30 mols of sulfur dioxide per mol of isopentane were mixed, preheated and charged to a fixed bed reactor containing the chromia-alumina catalyst of Example II. The reactor temperature was maintained at an average of 1020° F., with the isopentane space velocity at approximately 1.0 weight of isopentane per hour per weight of catalyst. The run was continued for two hours during which time the per pass yield of thiophene and 3-methyl thiophene were 3.8 and 10.3%, respectively, with ultimate yields of 19.1 and 51.4%, respectively, based on the weight of the isopentane charge.

Example IV 2,3-dimethyl butane and sulfur dioxide in a mol ratio of approximately one mol of sulfur dioxide per mol of hydrocarbon were charged to a fixed bed reactor containing the chromia-alumina catalyst of Example II. The temperature of the reactor was maintained at an average of 1015° F. and the reactants charged at a space velocity of approximately 0.78 weight of 2,3-dimethyl butane per hour per weight of catalyst.

The run was continued for a period of two hours during which time the conversion to methyl thiophene and dimethyl thiophene represented a conversion of 2.2 and 11.8%, respectively, basis the hydrocarbon charge.

*Example V*

Ethane and sulfur dioxide were mixed in a mol ratio of 1.9 mols of sulfur dioxide per mol of ethane and charged to a fluidized fixed bed reactor containing a 10% chromia-alumina catalyst ground to 100–200 mesh. The reactants were charged at a space velocity of 0.4 weight of ethane per hour per weight of catalyst with the reaction temperature maintained at 1400° F. The run was continued for about three hours during which time the thiophene recovered represented a per pass conversion of 2.30% on the basis of the weight of the ethane charge.

It will be understood that these examples are merely illustrative of the preferred embodiment of the invention and that other catalysts, charge stocks and specific conditions of reaction may be employed in accordance with the previous description.

Obviously many modifications and variations of the invention as hereinbefore set forth may be made without departing from the spirit and scope thereof, and only such limitations should be imposed as are indicated in the appended claims.

I claim:

1. A process for the production of a compound containing a thiophene nucleus which comprises passing sulphur dioxide and an alkane containing at least two carbon atoms at a space velocity between 0.2 and 6.0 weight of alkane per hour per weight of catalyst into a reaction zone containing a solid contact catalyst, reacting said sulphur dioxide and said alkane in the vapor phase at a temperature of at least 800° F. to form said thiophene compound and removing from said reaction zone products of reaction containing said thiophene compound in substantial amount.

2. A process according to claim 1 in which the catalyst is acid-reacting.

3. A process according to claim 1 in which the alkane contains four to ten carbon atoms.

4. A process for the production of a compound containing a thiophene nucleus which comprises passing sulphur dioxide and an alkane containing at least two carbon atoms at a space velocity of between 0.2 and 6.0 weights of alkane per hour per weight of catalyst into a reaction zone containing a catalyst selected from the group consisting of metal and metalloid oxides, sulfides and mixtures thereof stable under reaction conditions, reacting said sulphur dioxide and alkane in the vapor phase at a temperature of at least 800° F. to form said thiophene compound and removing from said reaction zone products of reaction containing said thiophene compound in substantial amount.

5. A process according to claim 4 in which the reaction is effected at a temperature of about 1100 to 1200° F.

6. A process according to claim 4 in which the catalyst is a group VI metal oxide supported on a surface-active material.

7. A process according to claim 4 in which the catalyst is a group VI metal sulfide supported on a surface-active material.

8. A process for the production of a compound containing a thiophene nucleus which comprises passing sulphur dioxide and an alkane containing at least two carbon atoms at a space velocity of between 0.2 and 6.0 weights of alkane per hour per weight of catalyst and at a mol ratio of sulphur dioxide to alkane of at least 0.5 into a reaction zone containing a catalyst selected from the group consisting of metal and metalloid oxides, sulfides and mixtures thereof stable under reaction conditions, reacting said sulphur dioxide and alkane in the vapor phase at a temperature of at least 800° F. to form said thiophene compound and removing from said reaction zone products of reaction containing said thiophene compound in substantial amount.

9. A process according to claim 4 in which the mol ratio of sulphur dioxide to alkane is between 1.5 to 2.5.

KENNETH L. KREUZ.

REFERENCES CITED

The following references are of record in the file of this patent:

UNITED STATES PATENTS

| Number | Name | Date |
|---|---|---|
| 2,126,817 | Rosen | Aug. 16, 1938 |
| 2,370,513 | Amos | Feb. 27, 1945 |
| 2,418,374 | Stone | Apr. 1, 1947 |